US005399080A

United States Patent [19]

Van Benthum

[11] Patent Number: 5,399,080

[45] Date of Patent: Mar. 21, 1995

[54] PELLET PRESS

[75] Inventor: Anthonius P. T. Van Benthum, Schijndel, Netherlands

[73] Assignee: A.P.T. Van Benthum Beheer B.V., Schijndel, Netherlands

[21] Appl. No.: 67,644

[22] Filed: May 18, 1993

[30] Foreign Application Priority Data

May 18, 1992 [NL] Netherlands ........................ 9200874

[51] Int. Cl.⁶ .......................... B29C 47/32; B30B 3/06

[52] U.S. Cl. .................................. 425/146; 264/40.5; 425/331; 425/365; 425/466; 425/DIG. 230

[58] Field of Search ................ 425/331, 146, 461–466, 425/DIG. 230, 365; 264/40.5

[56] References Cited

U.S. PATENT DOCUMENTS

| | | | |
|---|---|---|---|
| 2,565,830 | 8/1951 | Weston | 425/331 |
| 2,958,900 | 11/1960 | Meakin | 425/463 |
| 3,134,344 | 5/1964 | Lundell | 425/331 |
| 3,177,821 | 4/1965 | Harrington | 425/466 |
| 3,183,859 | 5/1965 | Peterson | 425/331 |
| 3,198,141 | 8/1965 | Knoth | 425/461 |
| 3,203,366 | 8/1965 | Lundell | 425/331 |
| 3,225,711 | 12/1965 | Forth et al. | 425/DIG. 230 |
| 3,251,316 | 5/1966 | Forth | 425/190 |
| 3,251,317 | 5/1966 | Forth | 425/190 |
| 3,425,362 | 2/1969 | Lundell | 425/DIG. 230 |
| 3,518,723 | 7/1970 | Wooding | 425/DIG. 230 |
| 4,446,086 | 5/1984 | Molenaar et al. | 425/331 |
| 4,511,321 | 4/1985 | Howard | 425/DIG. 230 |
| 4,770,621 | 9/1988 | Groebli et al. | 425/DIG. 230 |
| 4,838,779 | 6/1989 | Vries | 425/DIG. 230 |
| 5,198,233 | 3/1993 | Kaiser | 425/331 |

FOREIGN PATENT DOCUMENTS

| | | | |
|---|---|---|---|
| 1411020 | 7/1988 | U.S.S.R. | 423/331 |

*Primary Examiner*—Jay H. Woo
*Assistant Examiner*—Joseph Leyson
*Attorney, Agent, or Firm*—Young & Thompson

[57] ABSTRACT

An installation is provided which has a press-through surface containing openings (13) and pressure elements (14) for pressing goods through the openings (13). According to the invention, the size of the openings (13) is variable in the installation. Preferably, this is effected in that opposite edges of the openings (13) are movable with respect to one another counter to the action of restoring elements (19). In this context the size of the openings (13) can be determined by the pressure exerted by the pressure elements (14). Preferably the press-through surface (12) is made up of segments (17), which delimit the openings (13).

4 Claims, 2 Drawing Sheets

PELLET PRESS

BACKGROUND OF THE INVENTION

The invention relates to an installation comprising a press-through surface containing openings and pressure means for pressing goods through the openings in the press-through surface. This known installation is used for kneading or rubbing pulverulent products in order to produce a coherent end product therefrom. For such particular purpose, so called pallet mills are known from e.g. U.S. Pat. Nos. 2,958,900 or 3,251,316, which are incorporated herein by reference. For example, the production of animal feed from meal or the production of chocolate can be considered. During processing using the known installation the pulverulent product is rendered plastic and freed from air, while the temperature of the product rises, as a result of which decomposition of, for example, proteins and/or starches occurs to provide the end product with the desired shape and hardness and to change the composition of the end product, such that in, for example, the processing of meals the nutritional value increases. Frequently, steam is supplied in order to improve the end result.

As a consequence of the increasing use of raw materials of, for example, a poorer quality or of a different type, increasingly more stringent demands are being made in respect of the kneading or rubbing treatment, especially with regard to the pressure under which the raw material is pressed through the openings in the press-through surface. At present this is solved by allowing the raw material successively to undergo various kneading operations, for example by feeding the raw material successively through various installations of the known type.

SUMMARY OF THE INVENTION

The object of the invention is to provide an improved installation of the abovementioned type with which the abovementioned problem is solved.

To this end the installation of the type specified in the preamble is characterized in that the size of the openings is variable.

As a consequence it has become possible to adjust the requisite pressure depending on the raw material by varying the size of the openings. By this means better control of the treatment process at the start, when there is no plasticized raw material yet present in the installation, has also become possible. The problem which exists at present is that at the start of the treatment process pulverulent raw material leaves the installation untreated because of the lack of any coherence preventing the raw material from issuing through the openings under the effect of gravity alone.

According to a preferred embodiment, opposite edges of the openings are movable with respect to one another counter to the action of restoring means. A reliable and controllable change in the size of the openings is achieved by this means. In this context, for simple operation of the installation the latter can be so designed that the size of the openings is determined under the effect of the pressure exerted by the pressure means. Adjustment of the size of the openings then takes place automatically from the moment of start-up.

Advantageously, ring-type bodies are used, as further illustrated in the accompanying drawings, which are deposited coaxially, and are axially urged towards each other. These ring-type bodies are in rest bearing with their sides against each other. A pressure built-up within the volume housed by these bodies will result in an axial movement of the bodies from each other, against the action of the restoration force. As a result, a circumferential slit is formed between two neighbouring bodies, through which the material can be pressed. The bodies can have a simple design, with flat bearing sides, and inclined inner edges to radially outwardly form a tapering narrowing slit.

U.S. Pat. Nos. 3,198,141, 3,177,821, 3,183,859 and 3,251,317, wafering machines are known as such. However, the wafering process completely differs from the pelleting process, such that the teachings from the field of wafering can not be assumed to anticipate in the field of pelleting.

BRIEF DESCRIPTION OF THE DRAWINGS

The invention will be explained in more detail below with the aid of non-limiting illustrative embodiment with reference to the drawings, In the latter.

DETAILED DESCRIPTION OF THE INVENTION

Figure 1:
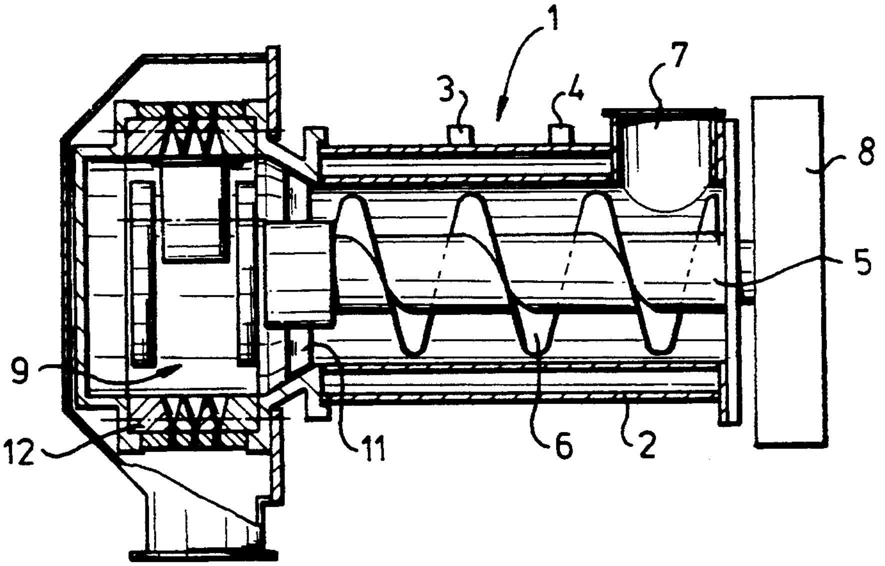
FIG. 1 shows, diagrammatically, a cross-sectional view of an installation according to the invention.
Figure 2:
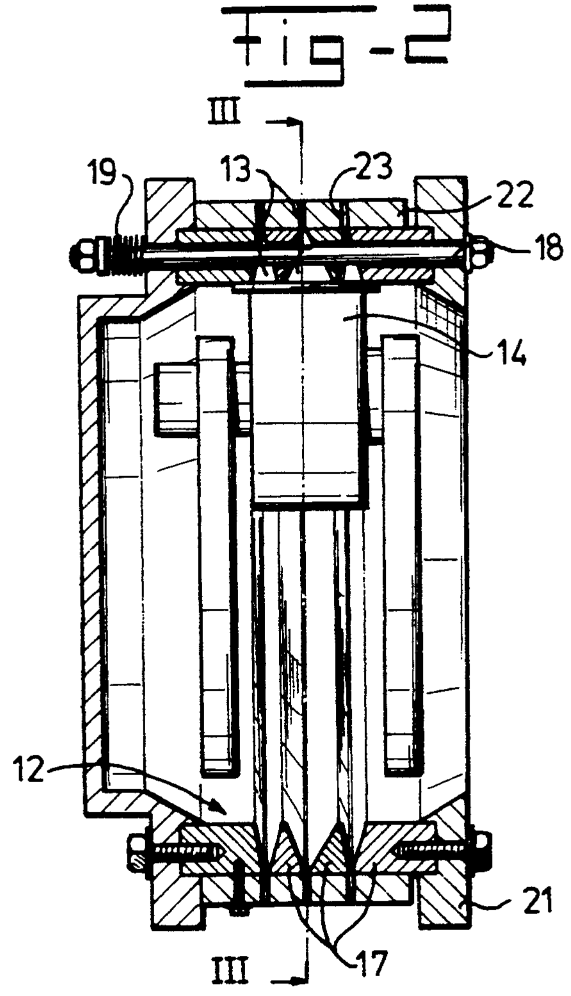
FIG. 2 shows a detail of the installation of FIG. 1, in cross-section.
Figure 3:
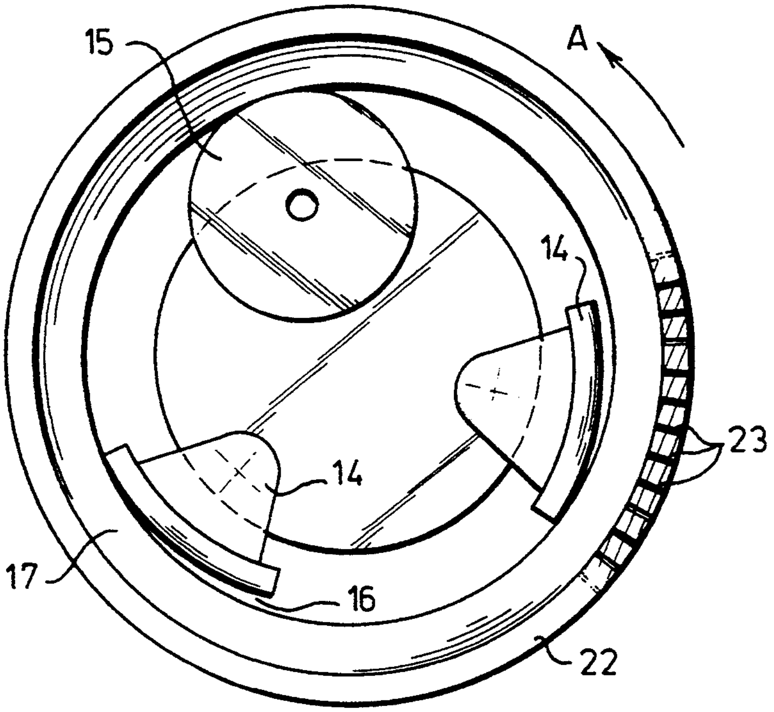
FIG. 3 shows a view along the line III—III in FIG. 2.

With reference to FIGS. 1–3, the installation 1 comprises a drum-shaped feed sleeve 2, which has connection points 3, 4 for supplying steam and other additives such as soya oil, molasses or water. The sleeve 2 has an intake 7 for feeding in pulverulent raw material. A rotatable conveyor shaft 5 is fitted inside the drum 2. Said conveyor shaft is provided with conveyor propeller blades 6. If appropriate, the blades 6 can be replaced by conveyor paddles (not shown). The conveyor shaft 5 is driven by motor 8. By this means the raw material is conveyed from the drum-shaped feed sleeve 2 to the rubbing chamber 9, through the openings between the spokes 11 for suspension of the conveyor shaft 5.

The rubbing chamber 9 has a drum wall 12 containing closable openings 13 according to the invention. With the aid of rubbing shoes 14 (only one shown in FIGS. 1 and 2), the product introduced into the installation 1 is pressed through the drum wall 12 to the outside. FIG. 3 shows two rubbing shoes 14 and an alternative in the form of a rubbing roller 15 in the position where the third rubbing shoe is normally located. If rubbing shoes 14 are used these are rigid, so that they always assume the same position with respect to the drum wall. Rubbing rollers rotating about their axis can be used. Said rubbing shoes 14 or rubbing rollers 15 are also driven by the conveyor shaft 5 in the direction of the arrow A (FIG. 3) and thus move over the drum surface, forming a friction gap 16 with the drum surface, which gap widens in the direction of movement. Alternatively, the rubbing shoes 14 could be driven by an additional shaft, which runs through the conveyor shaft 5. This makes it possible to individually drive the shoes 14 and the propellors 6. The rubbing shoes 14 or rubbing rollers 15 are fixed in a known manner using an adjustable eccentric (not shown), so that their distance from the drum wall is adjustable.

The drum wall 12 comprises four rings 17, the edges of the rings which face one another being bevelled. The rings 17 are resiliently driven towards one another by three assemblies (one of which is shown in FIG. 2) comprising a through bolt 18 with a spring 19, as a result of which the gap-shaped openings 13 between the rings 17 are kept pressed closed when the installation 1 is not in operation.

By means of the interaction of rubbing shoes 14 and drum wall 12, the powder is mixed with the additives such as steam, kneaded and compressed, as a result of which the temperature of the powder rises to, for example, above 100° C., so that substances are decomposed. Above a certain pressure level the rings will be driven apart by the pressure of the mixture, counter to the action of the springs 19, as a result of which the gaps 13 open. To this end the side wall 21 of the rubbing chamber 9 can move to one side. The mixture can then be pressed through the drum wall 12 to the outside. The moment (i.e. the pressure) at which the gaps 13 open can be adjusted by means of correct choice of the pretensioning of the springs 19. Thus, the gaps 13 open only under an elevated pressure, which can be adapted to suit the conditions, and by this means pulverulent material is prevented from leaving the rubbing chamber 9 untreated on start-up. Moreover, the gap size adjusts automatically, so that a virtually constant pressure is maintained. Because the travel of the springs 19 is restricted, the gap size is also restricted, so that above a certain operating speed where the gaps are fully open the pressure can be increased without restriction by, for example, further increasing the operating speed.

A mold plate 22 which has a pattern of holes 23 is fitted over the drum wall 12. The holes 23 overlap the gaps 13 in the drum wall 12, so that material pressed out of the rubbing chamber 9 is immediately pressed through the holes 23. To this end the holes are located in peripheral trajectories over the gaps 13. By this means the kneaded product can be provided with a desired shape, such as the known bix shape in the case of animal feed. In this context the size and the pattern of the holes 23 are so chosen that the holes do not impair the pressure-controlling effect of the gaps 13.

Figure 4:
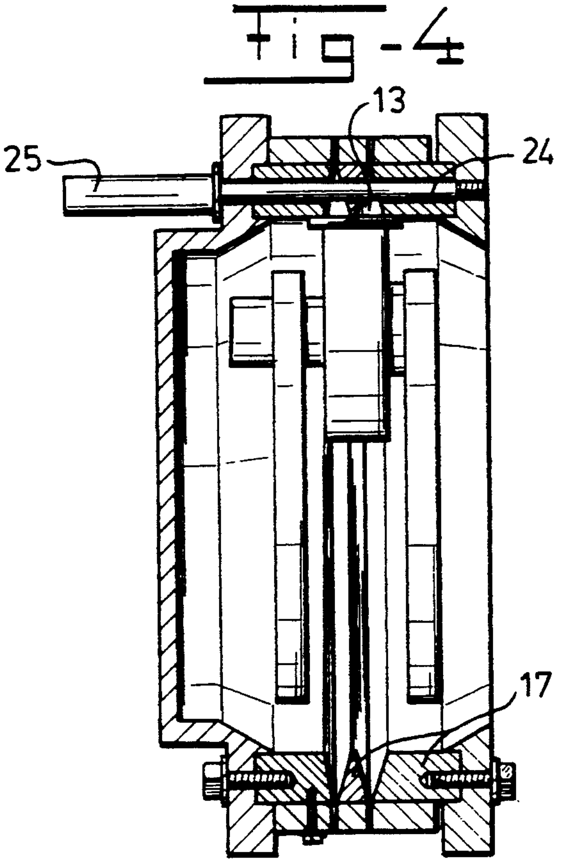
FIG. 4 shows a view corresponding to FIG. 2 of a variant of the installation according to the invention.

FIG. 4 shows an alternative for the rings 17 of the rubbing chamber 9. In this case three rings 17 are used which are driven towards one another by a rod 24 which is connected to a hydraulic cylinder 25. Hydraulic means such as cylinder 25 can also be used for urging the rings 17 towards each other in other embodiments, such as that of FIG. 2. By this means the pressure under which the mixture is pressed outside can be read off during operation, whilst intermediate adjustment is possible without shutting down the installation 1.

Thus, by means of the installation according to the invention it is possible efficiently to process pulverulent products of a different type or of a poorer quality. Of course, variants of the installation described above are also conceivable. For instance a different number of rings 17 can be used, such as two rings 17, such that there is only one gap 13 present in the device. In addition, the mold plate 22 can be dispensed with. In this case the product obtained will be in flake or granule form. It is also possible to design the rubbing shoes 14 to be stationary and to rotate the drum wall 12. In addition, a feed sleeve 2 can be fitted on both sides of the rubbing chamber 9. Moreover, the cylinder 25 in FIG. 4 can be driven pneumatically. It is also possible to use a rubbing surface instead of a rubbing chamber, such that the press-through surface is, for example, a flat disc. In addition it is not absolutely essential that the gaps 13 are closed at rest. As an alternative it is possible to use a different construction to make the openings adjustable, for example with slides, in which case the installation is, for example, not directly coupled to the pressure. The rubbing shoes or rubbing rollers can also be replaced by other pressure means, such as a screw extruder.

I claim:

1. A kneading apparatus comprising: a feed device with an intake for supplying raw material to be processed, a connection point for supplying an additive substance, an outlet connected to a rubbing chamber, said rubbing chamber having a press-through surface being formed by at least two concentric rings of essentially equal diameters, said rings having edges which face one another defined in opposing walls of said rings which form through channels therebetween, pressure means for pressing material from said chamber through said channels, said opposite edges at an end opposite the rubbing chamber being movable away from each other counter to the action of restoring means, said rings adapted to be moved apart in the axial direction of the rings, counter to the action of the restoring means, and wherein each opposing wall is inclined towards each other in an outward press-through direction.

2. A kneading apparatus according to claim 1, wherein the rings have substantially smooth sides facing each other, such that when two neighboring rings bear against each other, an opening defined between said opposite edges is closed.

3. A kneading apparatus according to claim 1, wherein on an end of the press-through surface opposite the rubbing chamber, the press-through surface is covered by a mold surface containing apertures, the channels in the press-through surface and the apertures in the mold surface being so situated relative to one another during pressing-through of the material that the material passes directly through the channels in the press-through surface and the apertures in the mold surface.

4. A kneading apparatus according to claim 1, wherein the pressure means comprise pressure surfaces which are movable essentially parallel to the press-through surface within the rubbing chamber, said pressure surfaces forming together with the press-through surface, a gap which widens in the direction of movement of the pressure means.

* * * * *